(12) United States Patent
Damkat (10) Patent No.: US 8,538,201 B2
(45) Date of Patent: Sep. 17, 2013

(54) IMAGE RESOLUTION ENHANCEMENT (75) Inventor: Chris Damkat, Eindhoven (NL)

(73) Assignee: TP Vision Holding B.V., Eindhoven (NL)

( * ) Notice: Subject to any disclaimer, the term of this patent is extended or adjusted under 35 U.S.C. 154(b) by 256 days.

(21) Appl. No.: 12/992,287

(22) PCT Filed: May 14, 2009

(86) PCT No.: PCT/IB2009/051999
§ 371 (c)(1),
(2), (4) Date: Dec. 9, 2010

(87) PCT Pub. No.: WO2009/141770
PCT Pub. Date: Nov. 26, 2009

(65) Prior Publication Data
US 2011/0081094 A1   Apr. 7, 2011

(30) Foreign Application Priority Data

May 21, 2008   (EP) .................................... 08156628

(51) Int. Cl.
*G06K 9/32* (2006.01)
(52) U.S. Cl.
USPC ....................................................... 382/299
(58) Field of Classification Search
None
See application file for complete search history.

(56) References Cited

U.S. PATENT DOCUMENTS

| | | | |
|---|---|---|---|
| 4,414,564 A | 11/1983 | Hitchcock | |
| 5,444,487 A | 8/1995 | Kondo et al. | |
| 6,192,161 B1 | 2/2001 | Kondo et al. | |
| 6,717,622 B2 | 4/2004 | Lan | |
| 6,766,067 B2 | 7/2004 | Freeman et al. | |
| 6,801,657 B1* | 10/2004 | Cieplinski | 382/164 |
| 7,113,223 B2 | 9/2006 | Manbeck et al. | |
| 2003/0182246 A1 | 9/2003 | Johnson et al. | |
| 2004/0086193 A1* | 5/2004 | Kameyama et al. | 382/254 |
| 2004/0218834 A1* | 11/2004 | Bishop et al. | 382/299 |
| 2007/0133903 A1 | 6/2007 | Zomet et al. | |
| 2009/0041351 A1* | 2/2009 | Kato et al. | 382/171 |

OTHER PUBLICATIONS

Super-Resolution Through Neighbor Embedding, Chang et al. 2004.*

Efros et al.: "Image Quilting for Texture Synthesis and Transfer", Proceedings of the 28th International Conference on Computer Graphics and Interactive Techniques, 2001, 6 page document.

(Continued)

*Primary Examiner* — Stephen R Koziol
*Assistant Examiner* — Delomia Gilliard
(74) *Attorney, Agent, or Firm* — Shimokaji & Assoc., P.C.

(57) ABSTRACT

The invention relates to upscaling of images such as upscaling of video images from standard definition to high definition. An input image is upscaled to a resolution enhanced image (207) by weighting pixel values in the input image depending on a match metric combining two match metrics. A first image generator (103) generates a blurred version of the input image and a second image generator (103) generates an upscaled interpolated version. The first metric is generated by comparing pixel sets of the blurred image and the upscaled interpolated image. A second metric is generated by comparing pixel sets of the input image and already synthesized pixel values of the resolution enhanced image (207). For each location in a search area, a resolution enhancement processor (107) generates the combined match metric and uses this to weigh the pixel value of that location when generating the unknown pixel value of the resolution enhanced image (207).

17 Claims, 5 Drawing Sheets

(56) References Cited

OTHER PUBLICATIONS

Jojic et al: "Epitomic Analysis of Appearance and Shape"; Proceedings of the Ninth IEEE International Conference on Computer Vision (ICCV'03), Oct. 2003, vol. 1, pp. 34-41.
Cheung et al: "Video Epitomes"; Proceedings of the IEEE Conference on Computer Vision and Pattern Recognition, 2005, 8 page document.
Fang et al: "Detail Preserving Shape Deformation in Image Editing": Proceedings of ACM Siggraph, 2007. vol. 26, Issue 3, 5 page document.
Freeman et al: "Example-Based Super-Resolution"; 2002 IEEE Computer Graphics. Mar./Apr. 2002, vol. 22, No. 2, pp. 56-65.
Wexler et al: "Space-Time Video Completion", Proceedings of the 2004 IEEE Computer Society Conference on Computer Vision and Pattern Recognition (CVPR 2004), pp. 1-120-1-127, vol. 1.
Zhu et al: "What are TEXTONS7", Department of Statistics, UCLA, 2002, Paper # 202010123, 18 page document.
Li et al: "New Edge-Directed Interpolation"; IEEE Transactions on Image Processing, Oct. 2001, vol. 10, No. 10, pp. 1521-1527.
Van Ouwerkerk, J.: "Image Super-Resolution Survey": Image AND Vision Computing, 2006, vol. 24, pp. 1039-1052.
Zhao et al: "Making the Best of Legacy Video on Modern Displays"; Journal of the SID, 2007, vol. 15, No. 1, pp. 49-60.
Tegenbosch et al: "Improving Non-Linear Up-Scaling by Adapting to the Local Edge Orientation"; Visual Communications and Image Processing, 2004, Proceedings of SPIE—IS&T Electronic Imaging, vol. 5308, pp. 1181-1190.
Wei, Y. "Texture Synthesis by Fixed Neighborhood Searching", Dissertation Submitted to the Department of Electrical Engineering and the Committee on Graduate Studies of Stanford Univerity, Nov. 2001, 148 pages.
Ashikhmin, J M,: "Fast Texture Transfer"; Nonphotorealistic Rendering, Jul./Aug. 2003, Published by the IEEE Computer Society, pp. 38-43.
Chang et al: "Super-Resolution Through Neighbor Embedding"; Proceedings of the 2004 IEEE Computer Socieety Conference on Computer Vision and Pattern Recognition (CVPR 2004), 8 page document.
Sun et al: "Image Hallucination With Primal Sketch Priors"; Proceedings of the 2003 IEEE Computer Society Conference on Computer Vision and Pattern Recognition (CVPR 2003), 8 page document.
Wang et al: "Patch Based Blind Image Super Resolution"; Proceedings of the Tenth IEEE International Conference on Computer Vision (ICCV 2005), 8 page document.
Irani et al: "Improving Resolution by Image Registration"; Graphical Models and Image Processing, 1991, vol. 53, No. 3, pp. 231-239.

* cited by examiner

IMAGE RESOLUTION ENHANCEMENT

FIELD OF THE INVENTION

The invention relates to image resolution enhancement and in particular, but not exclusively, to resolution enhancement for frames of a video sequence.

BACKGROUND OF THE INVENTION

Increasing the resolution of an image is commonly known as upscaling and is becoming of increasing interest. For example, due to the advent of various High Definition (HD) television standards, there is a desire for suitable methods and algorithms for generating HD images from Standard Definition (SD) images. For example, offline processing has been used to generate HD video sequences from original SD video sequences and television and DVD players etc have even been developed that can dynamically upscale SD video content to HD video content in real time.

Such upscaling typically uses interpolation to generate new pixel values using e.g. bilinear or bicubic interpolation, or polyphase scaling. However, although such methods increase the number of pixels in the image, they do not introduce new high frequency detail in the image and accordingly the upscaled images appear blurred. For conversion of standard definition (SD) video to high definition (HD) an upscaling factor of approximately 200% is required and for this and higher scale factors, the blurring tends to be clearly visible and undesirable.

In order to mitigate or compensate such perceived blurring, advanced non-linear techniques are often used in resolution enhancement to produce an image with a more detailed and sharp impression. Such methods include for example data dependent interpolation filters optimized using training and structure classification as described in T. Kondo, and K. Kawaguchi, "Adaptive dynamic range encoding method and apparatus", U.S. Pat. No. 5,444,487, August 1995. and T. Kondo et al., "Method and apparatus for adaptive filter tap selection according to a class", U.S. Pat. No. 6,192,161, February 2001. edge directed interpolation techniques as described in "New edge-directed interpolation." by Li and Orchard, IEEE Transactions on Image Processing 10: 1521-1527 2001. An overview and evaluation of many of these techniques can be found in "Image super-resolution survey.", by van Ouwerkerk; Image and Vision Computing 24(10): 1039-1052, 2006 and "Making the Best of Legacy Video on Modern Displays" Journal of the Society for Information Display—January 2007 Volume 15, Issue 1, pp. 49-60 by de M. Zhao, M. Bosma, and G. de Haan.

A specific example of a method for resolution enhancement used in televisions is known as Luminance Transient Improvement (LTI) with peaking LTI is a technique that improves the sharpness of edges by increasing the transient without creating overshoots thereby introducing new high-frequency content in the signal. Peaking is aimed at boosting the high-frequency components already present in the signal in order to give the images a sharper impression. A description of LTI can be found in J. Tegenbosch, P. Hofman and M. Bosma, "Improving nonlinear up-scaling by adapting to the local edge orientation", Proceedings of the SPIE, Vol. 5308, pp. 1181-1190, January 2004 and U.S. Pat. No. 4,414,564 A.

However, typically these methods mainly focus on generating sharper edge transitions and as a consequence they tend to lack sufficient enhancement capabilities in densely detailed areas such as textures. This lack of texture-/detail-enhancement can become more visible for increasing scaling factors and in particular for scaling factors above 200%.

Methods for texture synthesis have been proposed in e.g. "Texture synthesis by fixed neighborhood searching" by Wei, L.-Y., 2002 and "Fast Texture Transfer" by Ashikhmin, M; Computer Graphics and Applications, IEEE Volume 23, Issue 4, July-August 2003 Page(s): 38-43. The first of these articles disclose an example of the basic example-based texture synthesis which is a technique aimed at expanding texture in an image area based on a small texture patch being used as an example. However, although such methods are useful for covering an area by a suitable texture they are not directed to upscaling or resolution enhancement and are directed towards expanding a texture to a wider area rather than increasing the resolution of an existing texture area. The second document discloses a technique known as texture transfer (or sometimes called constrained texture synthesis) where the synthesis is steered by an extra target image.

Another method for upscaling is known as example-based super-resolution and is described in "Example-Based Super-Resolution."; Freeman, W. T.; Jones, T. R.; Pasztor, E. C., Computer Graphics and Applications, IEEE, vol. 22, no. 2, pp. 56-65, March/April 2002 and William T. Freeman and Thouis R. Jones, "One-pass super-resolution images" U.S. Pat. No. 6,766,067 Jul. 20, 2004.

Example-based super-resolution uses a database with sets of pre-stored images where each set comprises a low-resolution and a high-resolution version of the same scene. The input image to be upscaled is processed patch-by-patch and for each patch a best matching example is found in the database. The match is determined by comparing the low resolution content of the patch and the corresponding low resolution patches stored in the database for the example images. Furthermore, already synthesized pixel values of the upscaled image may be compared to pixels stored in the database as high resolution image examples corresponding to the low resolution match. This is achieved by letting the synthesized patches have a small overlap, which in effect imposes better spatial consistency. The high frequency components of the stored high resolution image for the best match are then used to synthesize the high-resolution output thereby generating an improved upscaled image. Specifically, pixel values may be copied from the stored high resolution image of the best matching example.

However, although this approach may provide good results for some images, it also tends to have some disadvantages. In particular, the generated high resolution images may not have optimal quality. For example, because the process is performed on a patch-by-patch basis, the spatial consistency in the output is not guaranteed. Furthermore, the example images may not accurately correspond to the image being processed thereby introducing inconsistencies. Also, in order to achieve a sufficiently high quality for many different input images, it is necessary to have a large number of example images stored thereby increasing resource requirements, complexity and cost. For example, memory requirements and search size and time characteristics may be high.

Hence, an improved image resolution enhancement would be advantageous and in particular a system allowing increased flexibility, reduced complexity, improved image quality, reduced resource consumption and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a method of resolution enhancement for an image, the method comprising: receiving a first image at a first resolution; generating a second image at the first resolution as a blurred image of the first image; generating a third image by upscaling the first image to a second resolution; synthesizing a resolution enhanced image at the second resolution by iterating for a plurality of pixel sets of the resolution enhanced image the steps of: selecting a first pixel set of the resolution enhanced image; selecting a comparison pixel set of the third image having a first predetermined spatial relationship to the first pixel set, the comparison pixel set having a resolution of the second resolution; selecting a synthesized pixel set of the resolution enhanced image having a second spatial relationship to the first pixel set, the synthesized pixel set having a resolution of the second resolution; for a plurality of locations in an image area: selecting a first location; determining a first match metric between the comparison pixel set and a first sample pixel set for the second image having a third spatial relationship to the first location, the first sample pixel set having a resolution of the first resolution; determining a second match metric between the synthesized pixel set and a second sample pixel set for at least one of the first image and the third image having a fourth spatial relationship to the first location, the second sample pixel set having a resolution of the first resolution; generating a combined match metric for the first location by combining the first match metric and the second match metric; and generating at least one pixel value for the first pixel set in response the combined match metrics and pixel values of a source image area of at least one of the first image and the third image.

The invention may allow an improved resolution enhancement of images, such as images of a video sequence. The invention may allow facilitated and/or low complexity implementation. In many cases, the invention may provide improved image quality of the resolution enhanced image and may in particular increase the detail level and high frequency content of the image.

For example, the invention may allow the generation/enhancement of textures (e.g. hair, fur, regular textures, etc) and edges. Specifically, the method is not limited to improving edge transitions. Furthermore, the invention may allow edge enhancement to be alias free, i.e. the method may achieve sharper edge transitions without introducing jaggies as part of the sharpening.

The invention may combine and provide some of the advantages and benefits provided by example based super resolution and example based texture synthesis. In particular, the approach may exploit assumptions of self-similarity and scale invariance to provide improved upscaling and in particular to generate and introduce additional details, edges and higher resolution texture.

Furthermore, the image resolution enhancement may be achieved without the necessity of providing and storing example images. Indeed, the second image and/or the first image may be used as example images for the synthesizing of pixels in the resolution enhanced image.

Thus, the approach may avoid the need for a database with examples of matching low resolution and high resolution image pairs. Furthermore, no texture image examples need to be stored.

The method uses image examples in the upscaling which are generated from the image being upscaled itself. Thus, the method may utilize an assumption of the image having a certain degree of self-similarity and having scale-invariant elements to generate additional detail in an upscaled image. By using the original image as a source for details and texture for the high resolution image, an improved enhanced image quality can often be achieved. Furthermore, this may substantially reduce complexity as a search for details can be limited since it can be assumed that in many scenarios the relevant detail is located close to the image position being synthesized.

The second image may comprise less high frequency components than the first image. The second image may specifically be blurred meaning that the spatial frequency bandwidth of the image data is substantially less than the spatial frequency bandwidth available at the second resolution. For example, the spatial frequency bandwidth of the image data may be less than 70% of the available bandwidth and may specifically be limited to only half the available bandwidth for an upscale factor of two.

The synthesized pixel set comprises pixels that have already been synthesized in one or more previous iterations. The first and second spatial relationships may be the same and/or may be different. Similarly, the third and fourth spatial relationships may be the same and/or may be different. A spatial relationship may for example specify a pixel area and/or image area adjacent to a pixel location being synthesized.

The first sample pixel set may comprise linearly upscaled and/or interpolated samples for the second image subsampled at the first resolution. This may achieve sub-pixel accuracy equivalent to the second resolution. Specifically, a pixel size of pixels of the first sample pixel set may be smaller than pixels of the first resolution and may in particular be of the same size as pixels of the second resolution. Specifically, pixels of the first sample pixel set may be on the same pixel grid as pixels of the resolution enhanced image.

The second sample pixel set may comprise linearly upscaled and/or interpolated samples for the first image subsampled at the first resolution. This may achieve sub-pixel accuracy equivalent to the second resolution. Specifically, a pixel size of pixels of the second sample pixel set may be smaller than pixels of the first resolution and may in particular be of the same size as pixels of the second resolution. Specifically, pixels of the second sample pixel set may be on the same pixel grid as pixels of the resolution enhanced image.

The number of pixels in the different pixels sets and image areas may be statically and/or dynamically determined. For example, the number of pixels in the synthesized pixel set and/or the comparison pixel set may be dynamically determined in response to characteristics of the first image.

In accordance with an optional feature of the invention, the step of generating at least one pixel value comprises generating a pixel value for a pixel of the first pixel set by a weighted combining of a plurality of pixel values of the source image area associated with a plurality of locations, the weighting of each pixel value of the plurality of pixel values depending on a combined match metric for the pixel value.

This may in many scenarios allow improved image quality of the resolution enhanced image and/or may allow facilitated implementation and/or reduced resource usage. E.g. a more natural image, without artifacts and/or with reduced noise may be synthesized.

In accordance with an optional feature of the invention, the step of generating at least one pixel value comprises: selecting a set of locations of the plurality of locations comprising locations for which the combined match metric matches a criterion; selecting a source pixel value for each location of the set of locations; and generating the at least one pixel value in response to the source pixel values.

This may in many scenarios allow improved image quality of the resolution enhanced image and/or may allow facilitated implementation and/or reduced resource usage. In particular, it may e.g. allow that the contribution to the pixel value for the resolution enhanced image is limited to pixel values for particularly suitable locations in the source images. The criterion may for example comprise a requirement that the combined match metric exceeds a given threshold and/or that the combined match metric must be the highest determined match metric.

In accordance with an optional feature of the invention, the step of generating the second image comprises: downscaling the first image to generate a lower resolution image; and generating the second image by upscaling the lower resolution image to the first resolution.

This may in many scenarios allow improved image quality of the resolution enhanced image and/or may allow facilitated implementation and/or reduced resource usage. In particular, it may allow an efficient generation of a blurred image. The approach may allow a generation of a second image that has similar quality degradation relative to the first image as the third image has relative to the resolution enhanced image. Thus, the feature may allow a particularly suitable generation of an example image useful for adding details based on an assumption of self-similarity and scale invariance.

The upscaling may specifically comprise interpolation or other spatial filtering. Thus, the upscaling may specifically be an upscaling that does not introduce any additional spatial frequencies to the lower resolution image. The upscaling may use the same algorithm and/or settings that are used for generating the third image from the first image.

In accordance with an optional feature of the invention, a ratio between a resolution of the lower resolution image and the first resolution is substantially the same as a ratio between the first resolution and the second resolution.

This may in many scenarios allow improved image quality of the resolution enhanced image and/or may allow facilitated implementation and/or reduced resource usage. In particular, it may allow the images to accurately reflect the self similarity and scale invariance across the resolution difference between the first resolution and the second resolution.

The ratios may in many embodiments be identical and/or may be within 10% of each other.

In accordance with an optional feature of the invention, there is provided claim 6.

This may in many scenarios allow improved image quality of the resolution enhanced image and/or may allow facilitated implementation and/or reduced resource usage.

In accordance with an optional feature of the invention, an upscaling factor between the first image and the resolution enhanced image is two.

This may in many scenarios allow improved image quality of the resolution enhanced image and/or may allow facilitated implementation and/or reduced resource usage.

In accordance with an optional feature of the invention, the second sample pixel set is selected from the third image.

This may in many scenarios allow improved image quality of the resolution enhanced image and/or may allow facilitated implementation and/or reduced resource usage. In particular, it may in many scenarios allow a compensation for offset differences in the pixel edge locations between the resolution enhanced image and the first image.

In accordance with an optional feature of the invention, the selection of the second sample pixel set comprises subsampling pixels of an area of the third image at the first resolution.

This may in many scenarios allow improved image quality of the resolution enhanced image and/or may allow facilitated implementation and/or reduced resource usage. In particular, this may allow the resolution enhancement to introduce additional detail.

In accordance with an optional feature of the invention, pixel centers of pixels of the second sample pixel set are spatially offset relative to pixel centers of pixels of the first image.

This may in many scenarios allow improved image quality of the resolution enhanced image and/or may allow facilitated implementation and/or reduced resource usage. The spatial offset may specifically be less than a pixel width at the first resolution. The feature may in many scenarios allow a compensation for offset differences in the pixel edge locations between the resolution enhanced image and the first image.

In accordance with an optional feature of the invention, the combined match metric comprises a weighted summation of the first match metric and the second match metric.

This may in many scenarios allow improved image quality of the resolution enhanced image and/or may allow facilitated implementation and/or reduced resource usage. In particular, it may in many scenarios allow a compensation for offset differences in the pixel edge locations between the resolution enhanced image and the first image.

In accordance with an optional feature of the invention, the comparison pixel set comprises less than 40 pixels.

This may in many scenarios allow improved image quality of the resolution enhanced image and/or may allow facilitated implementation and/or reduced resource usage. Specifically, it has been found that particularly high image quality and detail addition can be achieved for such small comparison pixel sets.

In accordance with an optional feature of the invention, the synthesized pixel set comprises less than 15 pixels.

This may in many scenarios allow improved image quality of the resolution enhanced image and/or may allow facilitated implementation and/or reduced resource usage. Specifically, it has been found that particularly high image quality and detail addition can be achieved for such small synthesized pixel sets. The number of pixels in the synthesized pixel set may be set in response to a period/scale/element size of the image texture that is being synthesizing.

In accordance with an optional feature of the invention, the step of determining the first match metric comprises determining the first sample pixel set of the second image by upscaling the second image to the second resolution and subsampling pixels at the first resolution.

This may in many scenarios allow improved image quality of the resolution enhanced image and/or may allow facilitated implementation and/or reduced resource usage. The spatial offset may specifically be less than a pixel width at the first resolution. The feature may in many scenarios allow a compensation for offset differences in the pixel edge locations between the resolution enhanced image and the first image.

According to an aspect of the invention there is provided an apparatus for resolution enhancement for an image, the apparatus comprising: means for receiving a first image at a first resolution; means for generating a second image at the first resolution as a blurred image of the first image; means for generating a third image by upscaling the first image to a second resolution; and means for synthesizing a resolution enhanced image at the second resolution by for a plurality of pixel sets of the resolution enhanced image iterating the steps of: selecting a first pixel set of the resolution enhanced image; selecting a comparison pixel set of the third image having a first predetermined spatial relationship to the first pixel set, the comparison pixel set having a resolution of the second resolution; selecting a synthesized pixel set of the resolution enhanced image having a second spatial relationship to the first pixel set, the synthesized pixel set having a resolution of the second resolution; for a plurality of locations in an image area: selecting a first location; determining a first match metric between the comparison pixel set and a first sample pixel set for the second image having a third spatial relationship to the first location, the first sample pixel set having a resolution of the first resolution; determining a second match metric between the synthesized pixel set and a second sample pixel set for at least one of the first image and the third image having a fourth spatial relationship to the first location, the second sample pixel set having a resolution of the first resolution; generating a combined match metric for the first location by combining the first match metric and the second match metric; and generating at least one pixel value for the first pixel set in response the combined match metrics and pixel values of a source image area of at least one of the first image and the third image.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to upscaling of an image of a video sequence. However, it will be appreciated that the invention is not limited to this application but may be applied to many other images.

Figure 1:
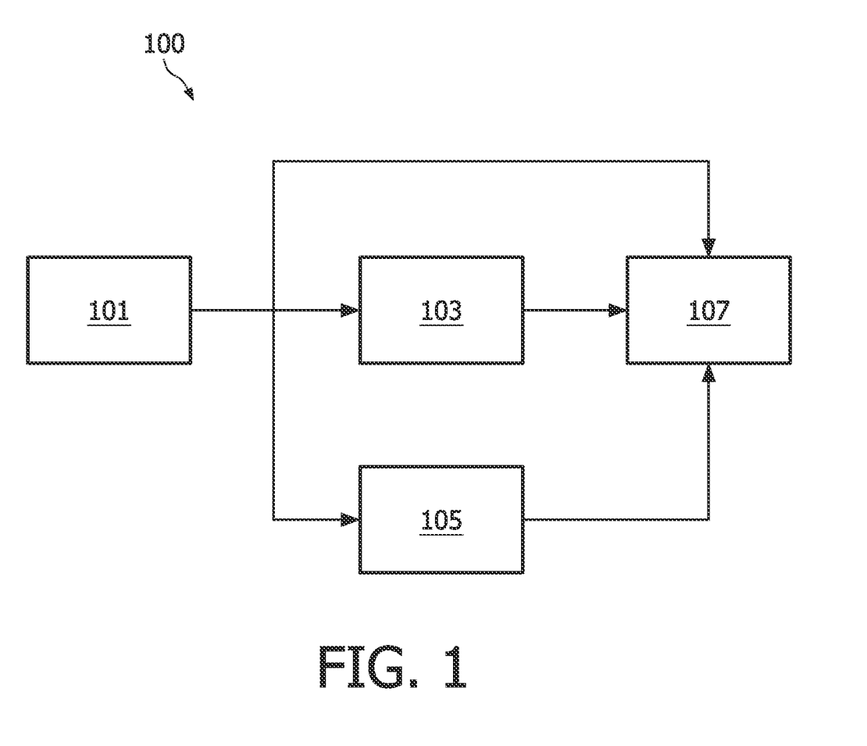
FIG. 1 is an illustration of an example of an image upscaler in accordance with some embodiments of the invention.

FIG. 1 illustrates an example of an image upscaler in accordance with some embodiments of the invention.

The image upscaler comprises a receiver 101 which receives a first image that is to be upscaled and enhanced. In the example, the image is received in a video sequence and in the example the receiver 101 is arranged to receive a digitally encoded video signal (such as an MPEG-2 signal) and to decode this to generate individual images which are then processed individually in the pixel domain.

It will be appreciated that the first image and video sequence may be received from any suitable internal or external source.

The first image is received at a first resolution which in the specific example is a Standard Definition (SD) resolution. As a specific example, the image may be a 720 by 576 pixel image which is to be upconverted with a scale factor of two to generate a High Definition (HD) image of 1440 by 1152 pixels. It will be appreciated that this upscaled image may subsequently e.g. be downscaled to the more widely used HD resolution of 1366 by 768 pixels e.g. by using linear interpolation.

The receiver 101 is coupled to a first image generator 103 which generates a second image which is at the same resolution as the first image but is a blurred version of this lacking some high frequency components. Thus, the second image is at the same resolution as the first image but has been blurred by removing some higher spatial frequencies of the first image.

Thus, in the second image, only the lower part of the frequency spectrum is filled, i.e. it not filled up to the level the image resolution allows. This is typically the case after (linear) upscaling (without full resolution enhancement), as the resolution of the image is increased, without (completely) filling the available broader spectrum with new high frequency components that are not available at the previous, lower resolution.

As a consequence, e.g. edge transitions become less steep and thus appear blurred or smoothed, i.e. less sharp and there is no (new) fine detail present in the image. Hence, for the second image, the full resolution of the second resolution is not fully exploited.

The receiver 101 is furthermore coupled to a second image generator 105 which proceeds to generate a third image by upscaling the first image to a second resolution corresponding to the resolution of the output resolution enhanced image. Thus, the second image generator 105 generates an HD image. The upscaling techniques used by the second image generator 105 are linear upscaling techniques such as interpolation based upscaling. The third image is perceived as relatively blurred at the second resolution as it does not comprise higher spatial frequencies than the first image.

The receiver 101, the first image generator 103 and the second image generator 105 are coupled to a resolution enhancement processor 107 which proceeds to generate the output resolution enhanced image by synthesizing pixel values of the image based on the first, second and third images. In addition, the pixel synthesis is additionally based on already synthesized pixel values of the resolution enhanced image.

Figure 2:
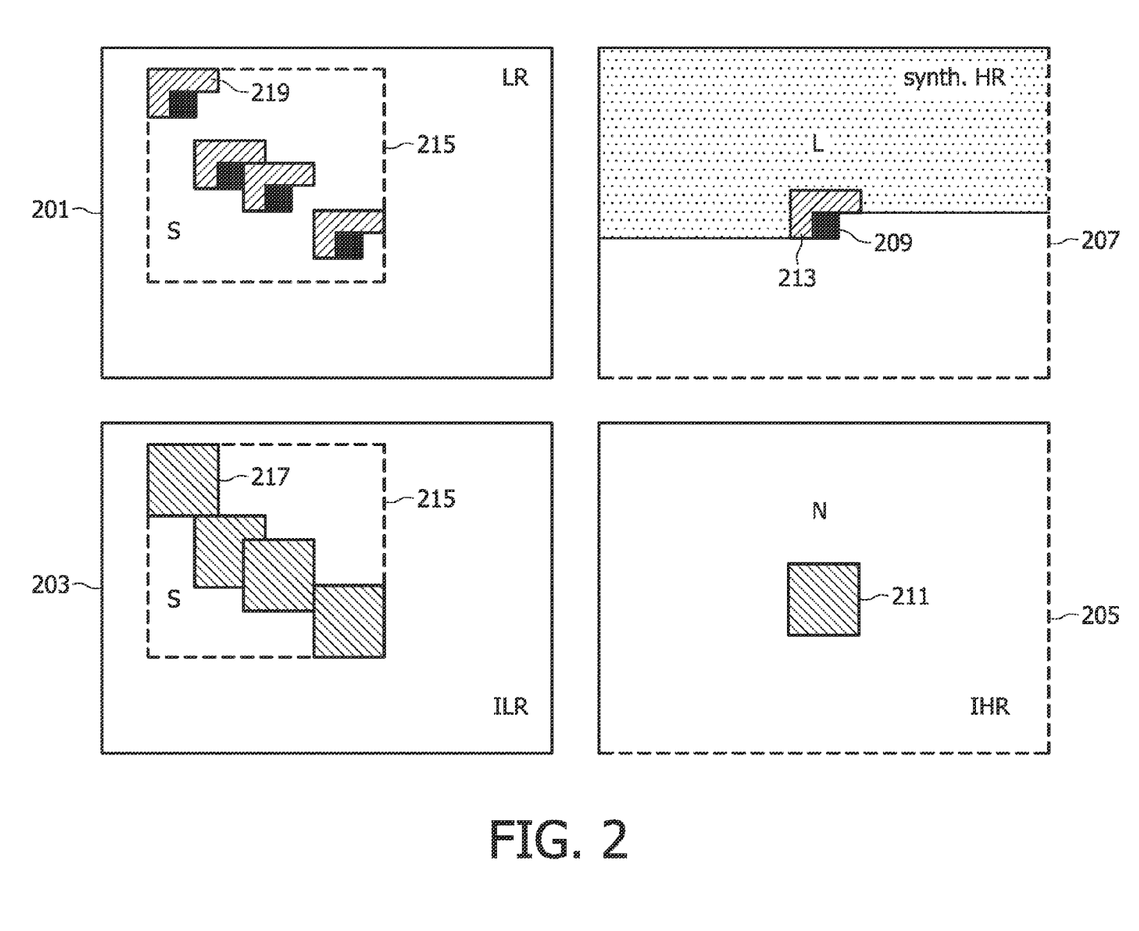
FIG. 2 is an illustration of an example of a processing of images in accordance with some embodiments of the invention.

Thus, as illustrated in FIG. 2, the resolution enhancement processor 107 uses four pictures in the resolution enhancement:

The first image 201 which is the received original image at a first (SD) resolution.

The second image 203 which is a blurred version of the first image 201 and is at the first (SD) resolution.

The third image 205 which is a linearly upscaled version of the first image 201 at the second (HD) resolution.

The resolution enhanced image 207 which is at the second (HD) resolution.

The algorithm used by the image upscaler uses elements similar to those of example based super resolution and example based texture synthesis. However, in contrast to these prior art approaches, the current approach allows improved image quality in many scenarios. Furthermore, the approach does not use or require a database of example images to provide the resolution enhancement but rather bases this enhancement on the image itself. Specifically, the first and second images 201, 203 are used as example image segments for the resolution enhancement.

The approach seeks to exploit properties of self similarity and scale invariance of image areas of the image to generate an enhanced high resolution image. In particular, the inventor has realized that many images/scenes contain a high amount of scale-invariant elements and self-similarity across scale and that this can be used to provide resolution enhancement. For example, edges are scale invariant and look the same at every scale and can essentially be copied from a low-resolution image to a high-resolution image, many textures such as hair looks similar at different scales etc. The current approach allows such realization to be used to not only generate sharper edges but also to generate additional details such as extra hairs, etc.

Figure 3:
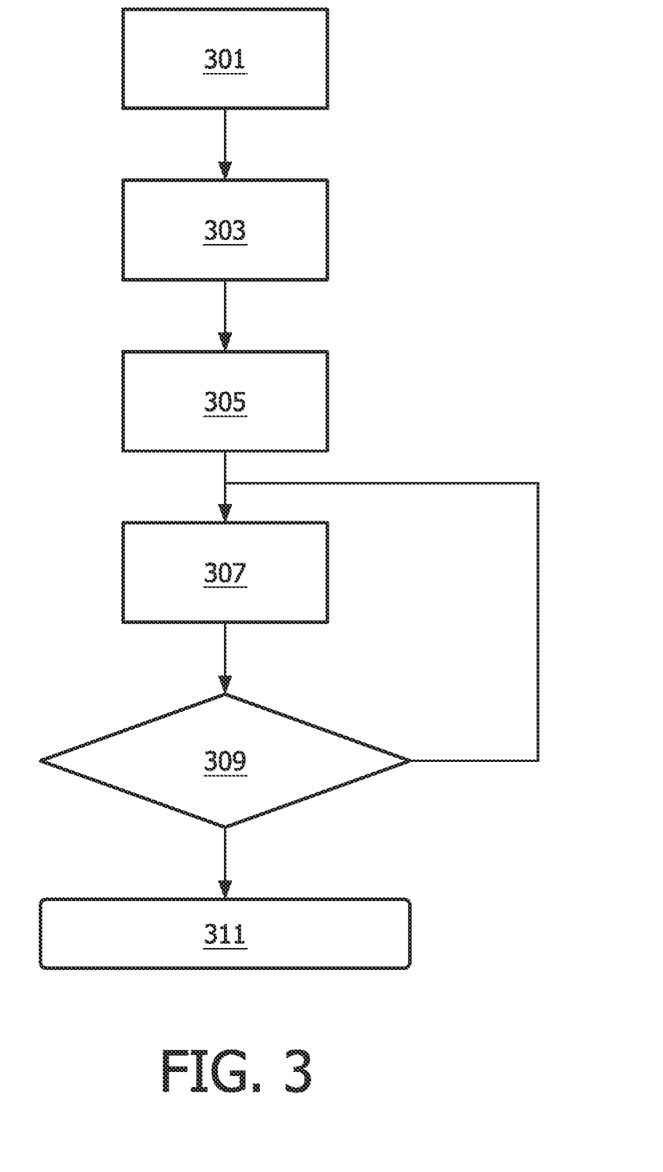
FIG. 3 is an illustration of an example of a method of image upscaling in accordance with some embodiments of the invention.

The operation of the image upscaler will in the following be described with reference to the exemplary flowcharts illustrated in FIGS. 3 to 5.

The method starts in step 301 wherein the first image 201 is received by the receiver 101.

Step 301 is followed by step 303 wherein the second image generator 105 proceeds to upscale the first image 201 to generate the third image 205 which has a resolution equal to the resolution enhanced image 207. The upscaling is a linear upscaling which generates an interpolated image at the second resolution (i.e. it is an HD image). Thus, in the example, the third image 205 does not contain any higher spatial frequencies than those present in the first image 201. However, it will be appreciated that in some embodiments some non-linear resolution enhancement techniques may be applied to the third image 205. If so, the same non-linear resolution enhancement techniques may be applied to the second image 203.

Step 303 is followed by step 305 wherein the first image generator 103 proceeds to generate the second image 203 as a blurred image of the first image 201 but with the same resolution. The second image 203 may specifically represent a blurring of the first image 201 which corresponds to the blurring of the third image 205 relative to the theoretically ideal resolution enhanced image of the underlying scene (i.e. corresponding to a sharp image originally captured at the second resolution). Specifically, the spatial frequencies of the second image 203 may be limited to a low frequency bandwidth that has a ratio relative to the bandwidth of the first image 201 which corresponds to the ratio between the spatial frequency bandwidths of the third image 205 and a full bandwidth high resolution image.

As a specific example, for an upscaling factor of two, the third image 205 may only comprise spatial frequencies in a bandwidth which is half of that possible at the second resolution. Accordingly, the second image 203 may be restricted to only comprise spatial frequencies in a bandwidth that is half of that possible at the first resolution.

As a consequence, the relative blurring of the second image 203 relative to the first image 201 corresponds closely to the relative blurring of the third image 205 relative to a theoretical ideal high resolution image corresponding to the first image 201. Therefore, under the assumptions of self similarity across scale, the relationship between the first and second image 203 can effectively be used to estimate the relationship between the third image 205 and the resolution enhanced image 207.

It will be appreciated that the generation of the blurred second image 203 may for example be achieved by spatially low pass filtering the first image 201. However, in the specific example, the first image generator 103 is arranged to generate the second image 203 by first downscaling the first image 201 to a lower resolution and then upscaling this image back to the first resolution.

Specifically, the downscaling may be by a factor which is equivalent to the ratio between the second resolution (i.e. that of the third image 205 and the resolution enhanced image 207) and the first resolution (i.e. that of the first and second images 201, 203). This may allow the first and second image pairs 201, 203 to better reflect the correlation between the third and resolution enhanced image pair 205, 207.

In many embodiments the scale factor between the first image 201 and the downscaled low resolution image is chosen to be identical to the scale factor between the resolution enhanced image 207 and the first image 201. In the specific example, a downscaling by a factor of two is applied to result in a downscaled image with a resolution of 360 by 288 pixels.

The downscaling may specifically be a linear downscaling achieved by applying a spatial anti-alias low pass filter, removing the high frequency components, followed by a down-sampling by a factor of two.

The downscaled image is then upscaled by the same scale factor using a linear upscaling algorithm. Specifically, the same upscaling algorithm as was used to upscale the first image 201 to the third image 205 may be used.

Thus, in the second image 203, only the lower part of the frequency spectrum is filled, i.e. it not filled up to the level the first resolution allows. This is typically the case after (linear) upscaling (without full resolution enhancement), as the resolution of the image is increased, without (completely) filling the available broader spectrum with new high frequency components that are not available at the previous, lower resolution.

As a consequence, e.g. edge transitions become less steep and thus appear blurred or smoothed, i.e. less sharp and there is no (new) fine detail present in the image. Hence, for the second image 203, the full resolution of the second resolution is not fully exploited.

The method then proceeds to generate the resolution enhanced image 207. The method uses a sequential pixel based approach wherein a set of pixels is synthesized at a time with the method iterating this synthesis until the entire resolution enhanced image 207 has been generated. Furthermore, the synthesis of a pixel set includes consideration of pixels that have been synthesized in a previous iteration.

In the specific example, one pixel of the resolution enhanced image 207 is synthesized at a time but it will be appreciated that in other embodiments a pixel set comprising two or more pixels may be synthesized together.

Thus, step 305 is followed by step 307 wherein the next pixel of the resolution enhanced image 207 is selected and synthesized. Step 307 is followed by step 309 wherein it is evaluated if all pixels of the resolution enhanced image 207 have been synthesized. If so, the method stops in step 311 and otherwise it returns to step 307 to process the next pixel.

Figure 4:
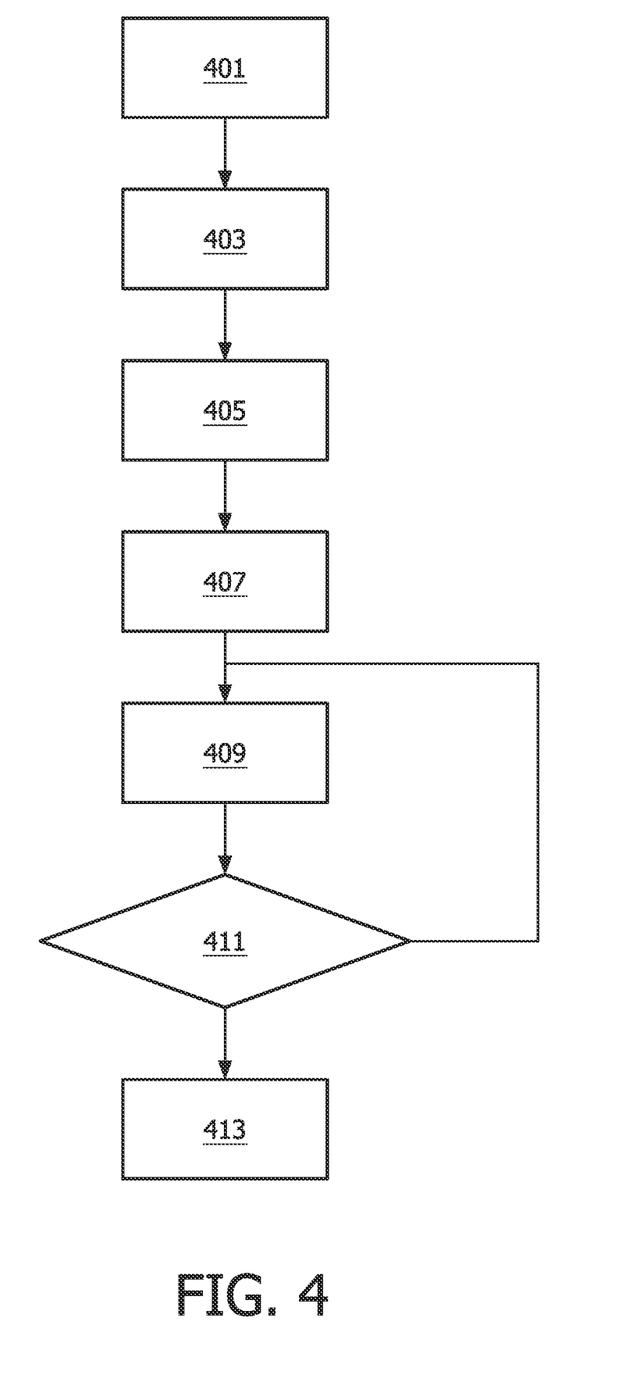
FIG. 4 is an illustration of an example of synthesizing an unknown pixel value in a method of image upscaling in accordance with some embodiments of the invention.

FIG. 4 illustrates the method used by the resolution enhancement processor 107 to synthesize a pixel value. FIG. 4 specifically illustrates the method used by the resolution enhancement processor 107 when a number of pixels have already been synthesized thereby allowing these to be used in the synthesis of the current pixel. However, it will be appreciated that any suitable method and approach for initiating the method without any already synthesized pixels may be used. For example, an initial set of pixels may simply be copied from the first image 201, the third image or set to zero values.

The method of FIG. 4 will be described with reference to FIG. 2 and the synthesis of the indicated unknown pixel 209. The method specifically proceeds to synthesize pixels line by line and from left to right, i.e. in a raster scan order. Thus, when the unknown pixel 209 is synthesized, all pixels above and to the left of the unknown pixel 209 in the resolution enhanced image 207 have already been synthesized.

The method of FIG. 4 proceeds to search for a suitable match for the current pixel in both the first image 201 and in the second (blurred) image 203. Specifically, the method searches for a match between neighboring synthesized pixels in the resolution enhanced image 207 and a corresponding set of pixels in the first image 201 and for a match between neighboring pixels in the third image 205 and a corresponding set of pixels in the second image 203. The matches are determined for the corresponding locations in the two images 201, 203 and are combined into a combined match metric. Thus, a search is performed with a match metric that includes both a component from a comparison between the two sharp pictures (the already synthesized resolution enhanced image 207 and the first image 201) as well as between the two blurred images (the second and third images 203, 205).

Furthermore, the matching is performed across the resolution boundary between the first and the second resolution. Specifically, by assuming self similarity and scale invariance, pixel sets at different resolutions are directly compared to each other and used to generate additional detail in the higher image. For example, for the upscale factor of two, a match between the blurred second and third images 203, 205 are found to occur if the pattern or pixel variation of the pixel set of the third image 205 matches that of the pixel set of the second image 203, i.e. if it effectively has corresponding spatial frequencies that are twice as high.

The method of FIG. 4 initiates in step 401 wherein the next unknown (not yet synthesized) pixel 209 is selected. As mentioned previously, the next pixel is selected as the pixel immediately to the right of the previously synthesized pixel in the resolution enhanced image 207.

Step 401 is followed by step 403 wherein a comparison pixel set 211 of the third image 205 is selected. The comparison pixel set 211 is selected as a set of pixels comprising the pixels that have a first predetermined spatial relationship to the synthesized pixel 209. In the specific example, the comparison pixel set 211 is simply selected as the pixels of the third image 205 that are within a given radius of the unknown pixel 209.

For example, the comparison pixel set 211 may comprise all pixels which are 1 pixel or less away from the position of the synthesized pixel. Thus, in the specific example, this will result in the comparison pixel set 211 corresponding to a square image area comprising nine pixels (including the pixel of the third image 205 which has the same location as the unknown pixel 209). It will be appreciated that in other embodiments, other pixel set sizes may be used. For example, in many embodiments advantageous performance is found for a radius of one to six pixels. For example, a pixel radius of three corresponding to 24 pixels in the pixel set often provides high performance.

It will be appreciated that any suitable selection of pixels for the comparison pixel set 211 may be used and that the pixel set does not necessarily need to correspond to a contiguous image area. Furthermore, it will be appreciated that other and in particular larger numbers of pixels may be included in the comparison pixel set 211. However, it has been found that for many images particularly good resolution enhancement is achieved by keeping the number of pixels relatively low. Particularly advantageous performance has been found for comparison pixel sets that comprise less than 40 pixels. The generated comparison pixel set 211 is later used to search for matches in the second image 203 as will be described in more detail later.

Step 403 is followed by step 405 wherein a synthesized pixel set 213 of the resolution enhanced image 207 is selected. The synthesized pixel set 213 is selected as a set of already synthesized pixels of the resolution enhanced image 207 that have a second predetermined spatial relationship to the synthesized pixel 209. In the specific example, the comparison pixel set 211 is simply selected as the pixels of the resolution enhanced image 207 that have been synthesized and are within a given radius of the unknown pixel 209.

For example, the synthesized pixel set 213 may comprise all synthesized pixels which adjacent to the unknown pixel 209. Thus, in the specific example, this will result in an L-shaped synthesized pixel set 213 corresponding to an L-shaped region comprising four pixels. The generated synthesized pixel set 213 is later used to search for matches in the first image 201 (or the third image 205) as will be described in more detail later.

It will be appreciated that any suitable selection of pixels for the synthesized pixel set 213 may be used and that the pixel set does not necessarily need to correspond to a contiguous image area. Furthermore, it will be appreciated that other and in particular larger numbers of pixels may be included in the synthesized pixel set 213. However, it has been found that for many images particularly good resolution enhancement is achieved by keeping the number of pixels relatively low. Particularly advantageous performance has been found for synthesis pixel sets that comprise less than 15 pixels.

Both the comparison pixel set 211 and the synthesized pixel set 213 are at the second resolution of the third image 205 and the resolution enhanced image 207. Thus, both the comparison pixel set 211 and the synthesized pixel set 213 are at the high resolution of the output image. The method continues to match these high resolution pixel sets to corresponding pixel sets in the first and second image 201, 203. However, these pixel sets are at the first resolution and thus a matching across the resolution gap is performed.

Specifically, the method continues to search an image area comprising a number of locations. For each location, a combined match metric is calculated which takes into account both the match for the comparison pixel set 211 and the synthesized pixel set 213 at that location.

Specifically, step 405 is followed by step 407 wherein a suitable search image area 215 is selected. The search image area 215 may for example be selected as a square image area which comprises 20 by 20 pixels at the first resolution (corresponding to 40 by 40 pixels at the second resolution). It will be appreciated that in other embodiments other search image areas may be used and in particular that larger search image areas (or indeed the entire image) can be used. However, it has been found that particularly advantageous performance may often be achieved for image areas of 625 or less pixels at the first resolution. Indeed, such relatively small search image areas may not only reduce complexity and resource demand but may also in many scenarios increase the probability that appropriate matches within the same image object are identified (e.g. within the same texture). Thus, it may reduce the probability that spurious matches in image areas not related to the same visual object are taken into account when generating the pixel value of the unknown pixel 209.

The method proceeds to sequentially evaluate each location in the search image area 215 to determine a match metric. Specifically, the method continues in step 409 wherein a combined match metric is determined for the next location of the search image area 215.

The method then continues in step 411 wherein it is evaluated if the current location was the last location in the search image area 215 (i.e. that all locations have been evaluated). If so, the method continues in step 413 wherein a pixel value for the synthesized pixel is determined. Otherwise the method returns to step 409 wherein the match metric for the next location is determined.

Figure 5:
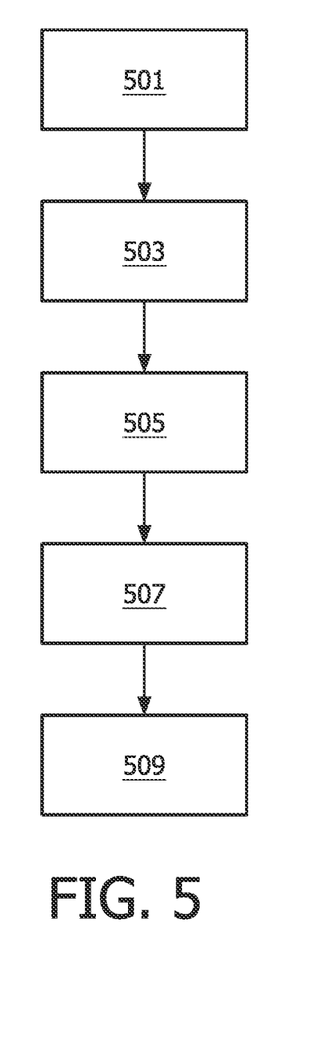
FIG. 5 is an illustration of an example of pixel set matching in a method of image upscaling in accordance with some embodiments of the invention.

FIG. 5 illustrates the processing of step 409 in more detail.

The process initiates in step 501 wherein a first sample pixel set 217 of the second image 203 is determined for the current location. The first sample pixel set 217 is in the specific example set to be a pixel set which directly corresponds to the comparison pixel set 211 in the third image 205. Thus, in the specific example, the first sample pixel set 217 corresponds to a square of nine pixels in the second image 203. However, as the second image 203 is at the first resolution whereas the third image 205 is at the second resolution, a match is performed across the resolutions. However, under the assumption of self similarity of the image region, this comparison corresponds to a comparison between different scales of the texture thereby allowing a more detailed texture to be generated at the second resolution. This can be achieved by the copying and repeating of sharp texture elements from the first image 201. Similarly, the assumption of scale invariance allows edges to be copied from the first image 201, since edges look the same at every scale.

In the example, the same spatial relationship may be used, i.e. the first sample pixel set 217 may be selected as the 9 pixels that surround the current location.

Step 501 is followed by step 503 wherein a first match metric is calculated for the first sample pixel set 217 and the comparison pixel set 211. It will be appreciated that any suitable match metric and distance criterion may be used to determine the match metric. For example a reciprocal average squared pixel value difference for the nine pixel pairs may be generated.

Thus, the first match metric is indicative of how well pixel sets of corresponding locations in the two blurred images match each other. As the third image 205 corresponds to a blurred version of the theoretical ideal resolution enhanced image, a strong match between pixels of the third image 205 and pixels of the second image 203 are indicative of the first image 201 matching the theoretical ideal resolution enhanced image at this location. Furthermore, as the two images are equally blurred, the assumption of scale invariance results in this being likely to reflect that the corresponding pixel of the first image 201 is an accurate reflection of the unknown pixel value. Thus, if the blurred images 203, 205 match across the resolution gap it is likely that there will also be a strong match between the resolution gap between the first image 201 and the theoretical ideal resolution enhanced image.

Step 503 is followed by step 505 wherein a second sample pixel set 219 of the first image 201 is determined for the current location. The second sample pixel set 219 is in the specific example set to be a pixel set which directly corresponds to the synthesized pixel set 213 in the resolution enhanced image 207. Thus, in the specific example, the second sample pixel set 219 corresponds to an L-shape comprising four pixels (the four pixels above and to the left of the current location). However, as the first image 201 is at the first resolution whereas the resolution enhanced image 207 is at the second resolution, a match is performed across the resolutions. However, under the assumption of scale invariance of the image region, this comparison corresponds to a comparison between different scales of the texture thereby allowing a more detailed texture to be generated at the second resolution.

Step 505 is followed by step 507 wherein a second match metric is calculated for the second sample pixel set 219 and the synthesized pixel set 213. It will be appreciated that any suitable match metric and distance criterion may be used to determine the match metric. For example a reciprocal average squared pixel value difference for the nine pixel pairs may be generated.

Thus, the second match metric is indicative of how well pixel sets of corresponding locations in the two sharp images 207, 201 match each other. As the resolution enhanced image 207 is assumed to correspond to an estimated version of the theoretical ideal resolution enhanced image, a strong match between pixels of this image and pixels of the first image 201 is indicative of the first image 201 matching the theoretical ideal resolution enhanced image at this location. Furthermore, as the two images are equally sharp, the assumption of scale invariance results in this being likely to reflect that the corresponding pixel of the first image 201 is an accurate reflection of the unknown pixel 209.

Furthermore, as the synthesized pixel set 213 is selected from already synthesized values in the output image, the matching ensures that there is a spatial consistency between the pixels being synthesized in the resolution enhanced image 207 and specifically that constraints between adjacent pixels are imposed from the first image 201. Furthermore, this enables texture (re-)synthesis, by repeating texture elements/periods.

Step 507 is followed by step 509 wherein a combined match metric is calculated for the current location by combining the first match metric and the second match metric. Specifically; the combined match metric may be generated as a weighted summation of the first match metric and the second match metric with the weights reflecting the relative importance of the matching between the sharp images and the blurred images respectively.

Specifically, the combined match metrics w(i,j) may be determined as:

$$w(i, j) = \exp\left(\frac{-(w_N \cdot d(v(N_{i,IHR}), v(N_{j,ILR})) + w_L \cdot d(v(L_{i,HR}), v(L_{j,LR})))^2}{f \cdot \sigma^2(i)}\right),$$

where i represents the location of the unknown pixel 209, j is the current location in the search image area 215, d(•, •) is a difference metric (such as the mean absolute difference (MAD)), $N_{i,IHR}$ represents the comparison pixel set 211, $N_{j,ILR}$ represents the first sample pixel set 217, $L_{i,HR}$ represents the synthesized pixel set 213, $L_{j,LR}$ represents the second sample pixel set 219. $w_N$ and $w_L$ are weights that may be adjusted to vary the relative influence of the two different matches. As a specific example, the values may be set to 1 and 0.75 respectively. Furthermore, f is a design parameter that control the fuzziness of the averaging and which may e.g. be set to 0.2.

σ(i) is a compensation factor that adapts the similarity function to the local contrast e.g. given by:

$$\sigma(i) = \min_{j' \in S_i} (w_N d(v(N_{i,IHR}), v(N_{j',ILR})) + w_L d(v(L_{i,HR}), v(L_{j',LR}))),$$

where $S_i$ is the image search area.

The weights $w_N$ and $w_L$ may be used to balance the influence of the blurred and sharp image matching in the combined match metric. Increasing the matching of the sharp images provides a stronger enforcement of spatial consistency. Since this spatial consistency is applied across the resolutions, it enforces the synthesis of periodic textures with the same pixel-period in the resolution enhanced image 207 as in the original first image 201, i.e. it simply doubles the number of texture periods in the texture. This enables re-synthesis of textures, e.g. the generation of more hair.

Thus for each location of the search image area 215, a combined match metric is generated which reflects the matching of both sharp and blurred images across scale. An advantage thereof is that both example-based super-resolution and texture synthesis can be applied. Using the blurred matching, a sharp equivalent of the structure being synthesized can be found at a different scale in the sharp first image 201 (e.g. a sharp edge given a blurred one) and can constrain the texture synthesis, i.e. the synthesized texture in the sharp resolution enhanced image 207 resembles the blurry, upscaled third image 205. At the same time the sharp match imposes spatial consistency of the resolution enhanced image 207 and enables (re)synthesis of various textures by repetition of texture elements, since local spatial relations are maintained across scale.

Following the generation of combined match metrics for the different locations of the search image area 215, the method proceeds in step 413 wherein a pixel value is generated for the unknown pixel 209 in response the combined match metrics as well as the corresponding pixel values of a source image area of the first image 201. In the specific example, the source image area is identical to the search image area 215 but it will be appreciated that in other embodiments, other source image areas may be used. For example, smaller areas may be selected based on the combined match metrics.

As a specific example, the resolution enhancement processor 107 may simply select the location in the search image area 215 having the highest combined match metric and then proceed to set the unknown pixel value to the pixel value for this location.

However, in the specific example of FIG. 2, the unknown pixel value is generated by combining pixel values for a plurality of pixel values in the source/search image area 215. Specifically, a weighted combining of a plurality of pixel values may be performed wherein the weighting of each pixel value depends on the combined match metric for that pixel value. Such an averaging may reduce artifacts in the resolution enhanced image 207 and may result in an image which appears more natural or soft. In addition, the averaging may reduce noise since similar structures are averaged from different locations and uncorrelated noise is thus reduced.

As a specific example, all pixel values in the search area may be combined with the specific weight w(i,j) as given above. Thus, the unknown pixel value may be generated as:

$$v_{HR}(i) = \frac{\sum_{j \in S_i} w(i,j) v_{LR}(j)}{\sum_{j \in S_i} w(i,j)}$$

In some embodiments, the resolution enhancement processor 107 may be arranged to first select a set of locations which have a combined match metric that meets a given criterion. For example, all locations for which the combined match metric is below a given value may be discarded and only locations for which the combined match metric is above the threshold are included in generating the unknown pixel value.

For example, the unknown pixel value may be generated by only including the source pixel values for the locations that meet the criterion in the above weighted summation.

It will be appreciated that the number of pixels included in the different pixel sets may be different in different embodiments and scenarios. For example, the size of the synthesized pixel set 213 used for comparison with the first image 201 may be selected such that it reflects the characteristics and properties of the texture being synthesized. Typically, the synthesized pixel set may be selected to include pixels within a radius of 1 to 6 (or even higher) pixels thereby providing both sufficient texture detail and spatial consistency. It will be appreciated that the sizes of the pixels sets may be statically determined but may also in some embodiments be dynamically selected in response to characteristics of the first image. For example, texture properties may be estimated by analysis of the pixel patterns in an image region in the first image, indicating the texture period and size of texture elements, and the size of the synthesized pixel set 213 may be set accordingly. E.g. for fine textures and edges, a lower radius may be set.

In the previously described example, the matching of the synthesized pixel set 213 was directly to the first image 201. However, in some embodiments, the synthesized pixel set 213 may be matched to the third image 205 when generating the second match metric. However, in these cases, the matching is still performed between the synthesized pixel set 213 at the second resolution and a second sample pixel set 219 which is at the first resolution. Thus, the synthesized pixel set 213 and the second sample pixel set 219 still covers differently sized visual areas of the scene represented by the image.

Specifically, the resolution enhancement processor 107 may proceed to subsample the third image 205 to generate the second sample pixel set 219. For example, in order to generate the L-shaped set of four pixels, the resolution enhancement processor 107 may proceed to select the pixel of the third image 205 which is two pixels to the left of the unknown pixel, the pixel which is two pixels above this, the pixel which is two pixels above the unknown pixel 209 and the pixel which is two pixels to the right of this.

Specifically, selecting the second sample pixel set 219 as a downsampled pixel set of the third image 205 may allow compensation for pixel edge offsets between the pixel location of the unknown pixel in the resolution enhanced image 207 and pixel edges of the first image 201. In particular, as the first and second images are on a coarser grid than the third image 205 and the resolution enhanced image 207, the accuracy of the matching process may be reduced as the pixel center of a pixel in the first and second image locations will not be identical to the pixel center of the pixels at the high resolution. This may in some scenarios introduce visible artifacts.

Accordingly, the first and/or second images 201, 203 may be upscaled to the second resolution (using an upscaling algorithm and specifically using linear interpolation). The matching may now be performed with smaller pixels having the same size as the pixels of the resolution enhanced image 207 and thus the same edges and centers. However, the matching is still performed with the first sample pixel set 217 and the second sample pixel set 219 at the first resolution. Thus, a subsampling is performed when selecting the first sample pixel set 217 and the second sample pixel set 219 with the selected samples having edges and centers corresponding to the selected location of the unknown pixel 209. Thus, in some embodiments the first sample pixel set 217 and the second sample pixel set 219 may comprise upscaled pixels at the second resolution but subsampled at the first resolution. Thus, the first sample pixel set 217 and the second sample pixel set 219 will also in this example be at the first resolution.

It will be appreciated that the same principle may be applied when generating the unknown pixel value. E.g., rather than selecting pixel values for combination in the first image 201, these may be selected in the third image 205 to correspond to interpolated pixel locations.

Hence, the described system may provide improved resolution enhancement. In particular, the presented system can provide an overall enhancement, enhancing textures as well as edges and other detail rather than just provide edge enhancement as for most prior art methods. Furthermore, this is achieved by an integrated solution, combining elements of example-based super resolution and constrained texture synthesis, while keeping resources low by exploiting self-similarity and scale invariance of elements of the input image.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A method of resolution enhancement for an image, the method comprising:
   receiving a first image at a first resolution;
   generating a second image at the first resolution as a blurred image of the first image;
   generating a third image by upscaling the first image to a second resolution;
   synthesizing a resolution enhanced image at the second resolution without referencing an image other than the first, second, and third images by iterating for a plurality of pixel sets of the resolution enhanced image the steps of:
   selecting a first pixel set of the resolution enhanced image;
   selecting a comparison pixel set of the third image having a first predetermined spatial relationship to the first pixel set, the comparison pixel set having a resolution of the second resolution;
   selecting a synthesized pixel set of the resolution enhanced image having a second spatial relationship to the first pixel set, the synthesized pixel set having a resolution of the second resolution;
   for a plurality of locations in an image area performing the steps of:
   selecting a first location;
   determining a first match metric between the comparison pixel set and a first sample pixel set for the second image having a third spatial relationship to the first location, the first sample pixel set having a resolution of the first resolution;
   determining a second match metric between the synthesized pixel set and a second sample pixel set for at least one of the first image and the third image having a fourth spatial relationship to the first location, the second sample pixel set having a resolution of the first resolution;
   generating a combined match metric for the first location by combining the first match metric and the second match metric; and
   generating at least one pixel value for the first pixel set in response to the combined match metrics and pixel values of a source image area of at least one of the first image and the third image.

2. The method of claim 1 wherein the step of generating at least one pixel value comprises generating a pixel value for a pixel of the first pixel set by a weighted combining of a plurality of pixel values of the source image area associated with a plurality of locations, the weighting of each pixel value of the plurality of pixel values depending on a combined match metric for the pixel value.

3. The method of claim 1 wherein the step of generating at least one pixel value comprises:
   selecting a set of locations of the plurality of locations comprising locations for which the combined match metric matches a criterion;
   selecting a source pixel value for each location of the set of locations; and
   generating the at least one pixel value in response to the source pixel values.

4. The method of claim 1 wherein the step of generating the second image comprises:
   downscaling the first image to generate a lower resolution image; and
   generating the second image by upscaling the lower resolution image to the first resolution.

5. The method of claim 4 wherein a ratio between a resolution of the lower resolution image and the first resolution is substantially the same as a ratio between the first resolution and the second resolution.

6. The method of claim 1 wherein an upscaling factor between the first image and the resolution enhanced image is two.

7. The method of claim 1 wherein the second sample pixel set is selected from the first image.

8. The method of claim 1 wherein the second sample pixel set is selected from the third image.

9. The method of claim 8 wherein the selection of the second sample pixel set comprises subsampling pixels of an area of the third image at the first resolution.

10. The method of claim 8 wherein pixel centers of pixels of the second sample pixel set (219) are spatially offset relative to pixel centers of pixels of the first image.

11. The method of claim 1 wherein the step of generating the combined match metric comprises a weighted summation of the first match metric and the second match metric.

12. The method of claim 1 wherein the comparison pixel set comprises less than 40 pixels.

13. The method of claim 1 wherein the synthesized pixel set comprises less than 15 pixels.

14. The method of claim 1 wherein the step of determining the first match metric comprises determining the first sample pixel set of the second image by upscaling the second image to the second resolution and subsampling pixels at the first resolution.

15. An apparatus for resolution enhancement for an image, the apparatus comprising:
  a receiver configured to receive a first image at a first resolution;
  a first image generator configured to generate a second image at the first resolution as a blurred image of the first image;
  a second image generator configured to generate a third image by upscaling the first image to a second resolution; and
  a resolution enhancement processor configured to synthesize a resolution enhanced image at the second resolution without referencing an image other than the first, second, and third images by, for a plurality of pixel sets of the resolution enhanced image, iterating the steps of:
    selecting a first pixel set of the resolution enhanced image;
    selecting a comparison pixel set of the third image having a first predetermined spatial relationship to the first pixel set, the comparison pixel set having a resolution of the second resolution;
    selecting a synthesized pixel set of the resolution enhanced image having a second spatial relationship to the first pixel set, the synthesized pixel set having a resolution of the second resolution;
    for a plurality of locations in an image area performing the steps of:
      selecting a first location;
      determining a first match metric between the comparison pixel set and a first sample pixel set for the second image having a third spatial relationship to the first location, the first sample pixel set having a resolution of the first resolution;
      determining a second match metric between the synthesized pixel set and a second sample pixel set for at least one of the first image and the third image having a fourth spatial relationship to the first location, the second sample pixel set having a resolution of the first resolution;
      generating a combined match metric for the first location by combining the first match metric and the second match metric; and
      generating at least one pixel value for the first pixel set in response to the combined match metrics and pixel values of a source image area of at least one of the first image and the third image.

16. A method of resolution enhancement for an image, the method comprising:
  (a) receiving a first image at a first resolution;
  (b) generating a second image at the first resolution as a blurred image of the first image by performing the method including:
    (1) downscaling the first image to generate a lower resolution image; and
    (2) generating the second image by upscaling the lower resolution image to the first resolution;
  (c) generating a third image by upscaling the first image to a second resolution;
  (d) synthesizing a resolution enhanced image at the second resolution without referencing an image other than the first, second, and third images by iterating for a plurality of pixel sets of the resolution enhanced image by performing the steps of method including:
    (1) selecting a first pixel set of the resolution enhanced image;
    (2) selecting a comparison pixel set of the third image having a first predetermined spatial relationship to the first pixel set, the comparison pixel set having a resolution of the second resolution;
    (3) selecting a synthesized pixel set of the resolution enhanced image having a second spatial relationship to the first pixel set, the synthesized pixel set having a resolution of the second resolution; and
  (e) for a plurality of locations in an image area performing the method including:
    (1) selecting a first location;
    (2) determining a first match metric between the comparison pixel set and a first sample pixel set for the second image having a third spatial relationship to the first location, the first sample pixel set having a resolution of the first resolution;
    (3) determining a second match metric between the synthesized pixel set and a second sample pixel set for at least one of the first image and the third image having a fourth spatial relationship to the first location, the second sample pixel set having a resolution of the first resolution;
    (4) generating a combined match metric for the first location by combining the first match metric and the second match metric; and
    (5) generating at least one pixel value for the first pixel set in response to the combined match metrics and pixel values of a source image area of at least one of the first image and the third image.

17. The method of claim 16 wherein a ratio between a resolution of the lower resolution image and the first resolution is substantially the same as a ratio between the first resolution and the second resolution.

* * * * *